R. W. JONES.
Snap-Hook.

No. 203,461. Patented May 7, 1878.

Witnesses:
T. C. Brecht
P. Burns

Inventor:
Richard W. Jones

UNITED STATES PATENT OFFICE.

RICHARD W. JONES, OF SYRACUSE, NEW YORK.

IMPROVEMENT IN SNAP-HOOKS.

Specification forming part of Letters Patent No. 203,461, dated May 7, 1878; application filed April 22, 1878.

*To all whom it may concern:*

Be it known that I, RICHARD W. JONES, of Syracuse, in the county of Onondaga and State of New York, have invented certain new and useful Improvements in Snap-Hooks; and I do hereby declare that the following is a full, clear, and exact description thereof, which will enable others skilled in the art to which it appertains to make and use the same, reference being had to the accompanying drawings, and to letters of reference marked thereon, which form a part of this specification.

Figure 1:
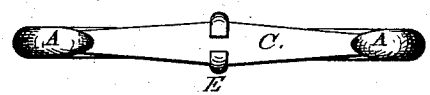
Figure 2:
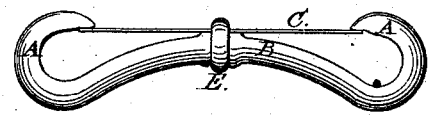
Figure 3:
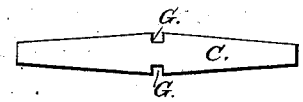
Figure 4:
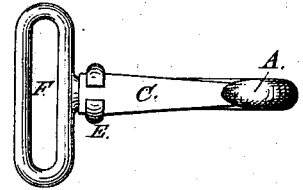
Figure 5:
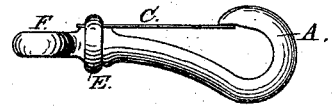

Figure 1 of the drawing is a plan view of a double snap-hook embracing my improvement. Fig. 2 is a side elevation of the same. Fig. 3 is the double spring used in this class of hooks. Fig. 4 is a plan view of a single snap-hook with the usual loop at the end. Fig. 5 is a side elevation of the same, and Fig. 6 the form of spring used in the single hook.

Like letters indicate corresponding parts in all the figures.

The nature of my invention consists in providing that class of snap-hooks in which a band or ring is used to secure the spring with an annular or circumferential groove around the shank of the hook as a seat for the ring; and also in providing a flat spring with recesses or notches to prevent lateral displacement.

In Figs. 1 and 2 a double snap is shown, which is made of any suitable metal, having its shank B bent or curved in reverse directions, as shown, and its two free ends formed into hooks A A. An annular groove or depression is formed around the center of the shank to form a seat for the band or ring E, which encircles both the shank of the hook and spring, holding the latter securely in place. With this double hook the spring C (shown detached in Fig. 3) is used. This spring is a flat piece of steel or other suitable metal, usually made wider at its center and tapering toward the ends. At its central portion I provide the notches or recesses G G, in which the band or ring E engages and entirely prevents any lateral displacement of the spring. The spring is made somewhat longer than the distance between the two ends of the hooks, so that its elasticity will hold it firmly against the ends of the hook, and prevent the ring or other article which is to be secured by the hooks from disengagement.

To put the parts together, the spring is laid on top of the shank with its ends resting against the inner ends of the hooks, which latter may be slightly recessed, if desired. The band E, which is of malleable metal, is then placed in the groove or recess in the shank and bent down firmly over the spring, falling into the notches G G, thus making a strong and secure connection.

Figure 6:
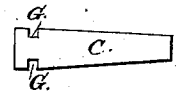

When but a single hook is required it is formed as shown in Figs. 4, 5, and 6.

Instead of forming a hook on each end of the shank, a single hook is formed thereon, and the shank is provided with the usual loop F at its rear end. The annular recess, in this instance, is made at or near the point where the shank and loop are united. A single spring is used, as shown in Fig. 6; but it has the notches or recesses G G, the same as in the double spring. In fact it is the same as the latter with the one end cut off or removed.

The advantage arising from the annular recess in the shank is that all tendency of the band or ring to slip back and forth thereon is overcome, and all danger of losing it, and thus rendering the hook worthless, is avoided. The recesses in the sides of the spring prevent any lateral displacement, and hold it securely in a line with the shank of the hook.

The uses of a snap-hook are so obvious that it is not necessary to enumerate them. My hook, on account of its simplicity of construction, is cheaply manufactured; on account of its form its parts are securely held together, and therefore not liable to loss; and the end or ends of the spring are always held in contact with the point of the hook, excepting during the operation of inserting or removing the rings.

If desired, the spring in the double hook may be made in two parts, in which case, of course, the bands and also two corresponding grooves in the shank would be necessary; but I prefer to make the spring of one piece, and apply it as shown in the drawings.

My hook being light, simple in its operation, and readily adjusted, is especially adapted for use on various parts of bridles and halters, as well as for other parts of harness where snap-hooks are generally used.

Having thus described my invention, what I claim as new, and desire to secure by Letters Patent, is—

1. A snap-hook having an annular recess in its shank to receive the band or ring which secures the spring in place, substantially as and for the purpose specified.

2. A snap-hook having an annular recess in its shank, and a spring provided with recesses or slots in its sides, to prevent displacement thereof, substantially as described.

In testimony that I claim the foregoing as my own I affix my signature in presence of two witnesses.

RICHARD W. JONES.

Witnesses:
P. BURNS,
W. F. PARDEE.